April 23, 1963   H. T. BREAZEALE ET AL   3,086,578
TIRE CHANGING APPARATUS

Filed July 28, 1960   5 Sheets-Sheet 1

INVENTORS
HERSHAL T. BREAZEALE,
FRED MAY & GEORGE MAY
BY
Barnes, Kisselle, Raisch & Choate
ATTORNEYS INVENTORS
HERSHAL T. BREAZEALE,
FRED MAY & GEORGE MAY
BY
Barnes, Kisselle, Raisch & Choate
ATTORNEYS INVENTORS
HERSHAL T. BREAZEALE,
FRED MAY & GEORGE MAY
BY
Barnes, Kisselle, Raisch + Choate
ATTORNEYS United States Patent Office 3,086,578
Patented Apr. 23, 1963

3,086,578
TIRE CHANGING APPARATUS
Hershel T. Breazeale, Dearborn, Fred May, Allen Park, and George May, Dearborn, Mich., assignors, by mesne assignments, to FMC Corporation, San Jose, Calif., a corporation of Delaware
Filed July 28, 1960, Ser. No. 45,996
10 Claims. (Cl. 157—1.24)

This invention relates to automatic tire changing equipment and more specifically to a combination pneumatically and electrically operated device for breaking the beads of old tires from the rim and for removal of the tire from the rim and the application of the tire to the rim.

In present day tire shops, it is extremely important that it be possible to change tires rapidly when, for example, a tire is being repaired or a new set of tires is sold. The automobile is usually moved into the garage space available and the wheels removed. The tires are then removed from the wheels, and the new tires applied.

Similarly, when a tire is being repaired, it is frequently removed from the wheel especially if a tube is involved. Thus, in order to avoid tie-up of the floor space, it is important that the tires be changed rapidly.

Moreover, with the present development of tubeless tires, it is more important that there be a positive bead seal between the wheel rim and the tire bead. This often results in an adherence of the bead to the wheel rim which is difficult to break away manually.

It is an object then of the invention to provide a compact tire changing machine which is very convenient for the operator and which reduces the amount of manual labor to a minimum and speeds up the tire changing operation.

It is another object of the invention to provide a device which will perform the functions desired without any injury to or strain on the tire.

It is a further object to provide a device which permits the breaking of both the upper and lower bead when the tire is mounted horizontally simultaneously and which also permits the breaking of a single bead when this is desired.

It is a further object to provide a bead breaking device which is self-centering so that it will readily adapt to different size tires without complicated adjustment.

Other objects and features of the invention relating to details of construction of the apparatus and the operation thereof will be apparent in the following description and claims.

Figure 1:
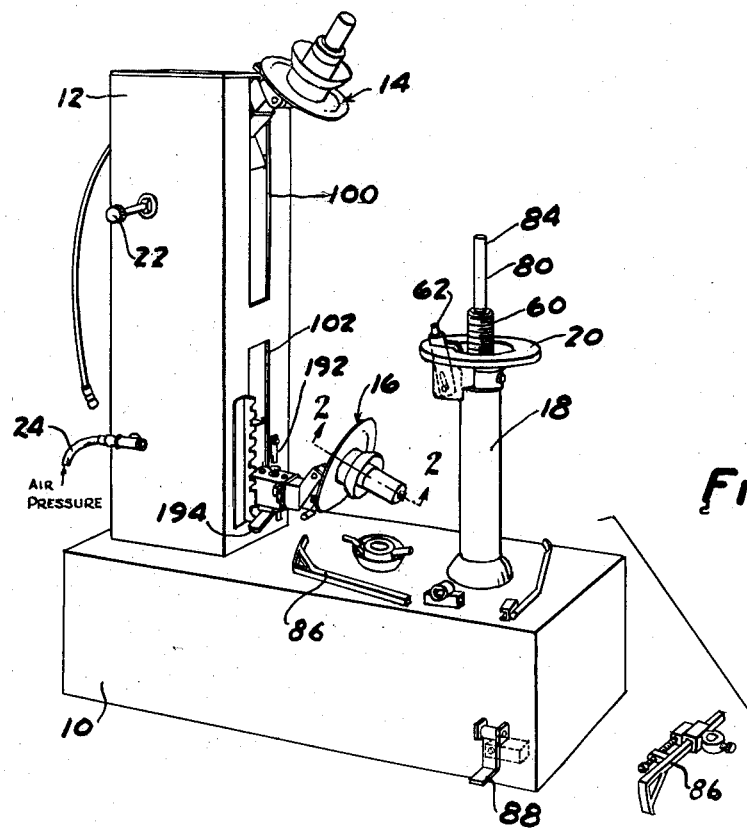

Drawings accompanying the disclosure and the various views thereof may be briefly described as:

FIGURE 1, a perspective view of the apparatus shown ready to receive a wheel and tire.

Figure 2:
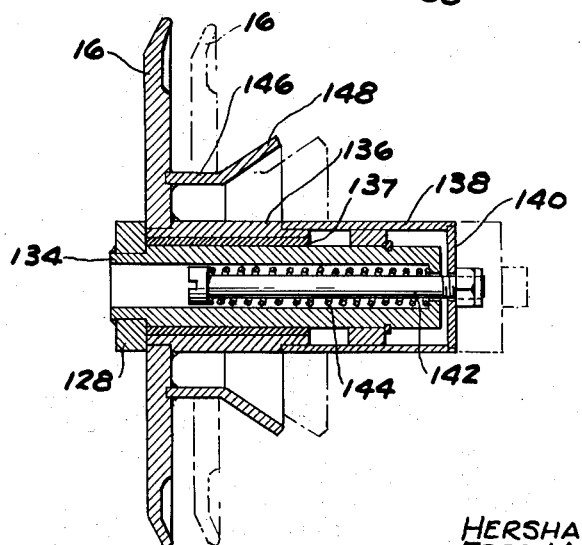

FIGURE 2, a sectional view on line 2—2 of FIGURE 1.

Figure 3:
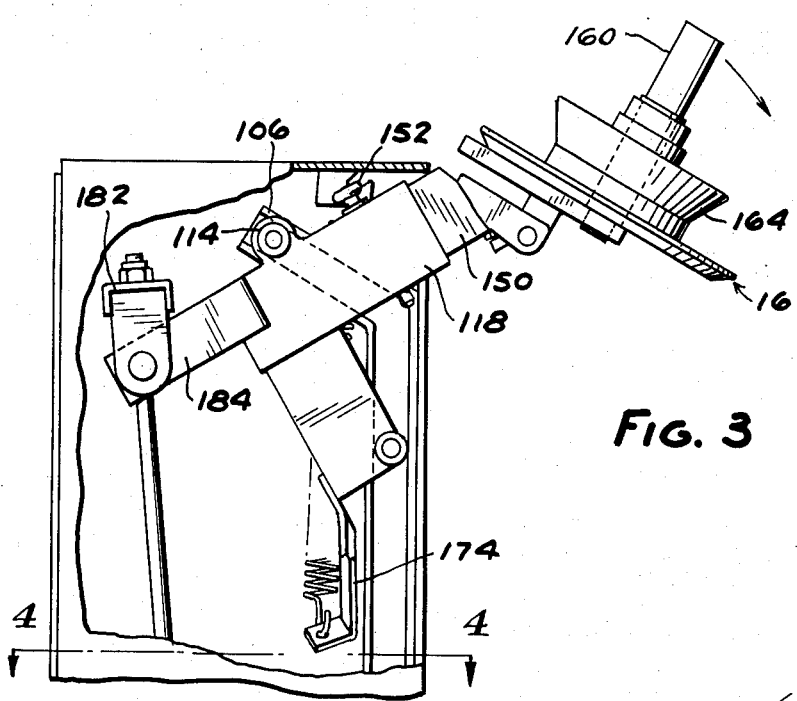

FIGURE 3, a detailed side elevation of the upper bead breaker disc.

Figure 4:
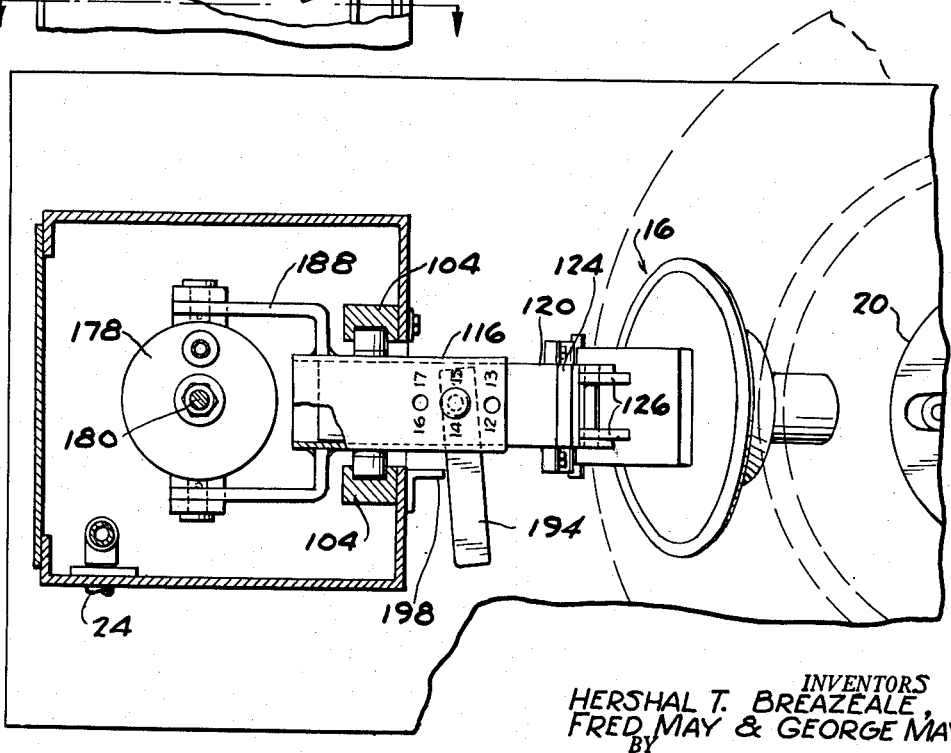

FIGURE 4, a sectional horizontal view on line 4—4 of FIGURE 3 showing the cylinder and the lower bead breaker disc.

Figure 5:
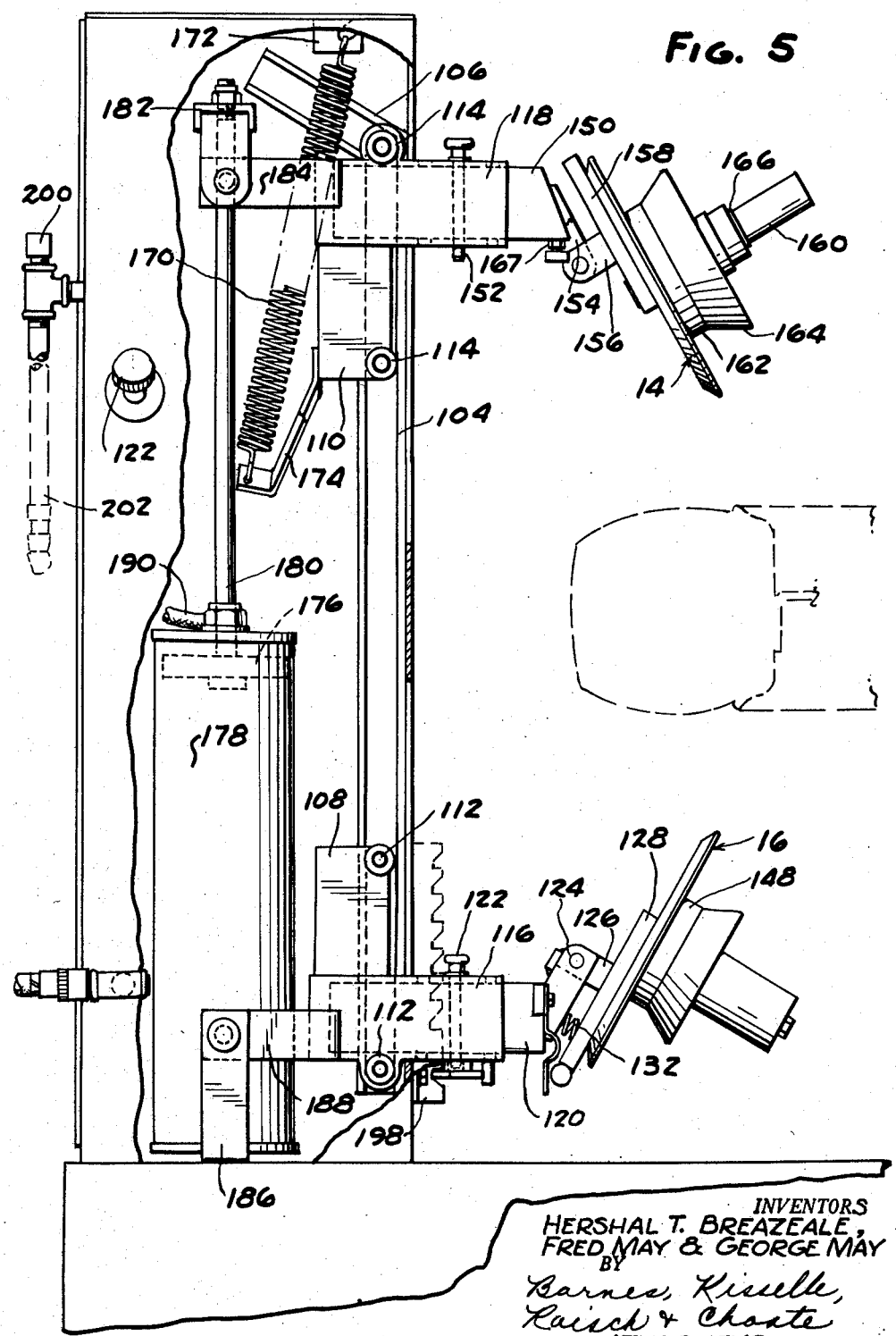

FIGURE 5, a complete side elevation of the bead breakers and operating mechanism with the housing wall broken away.

Figure 6:
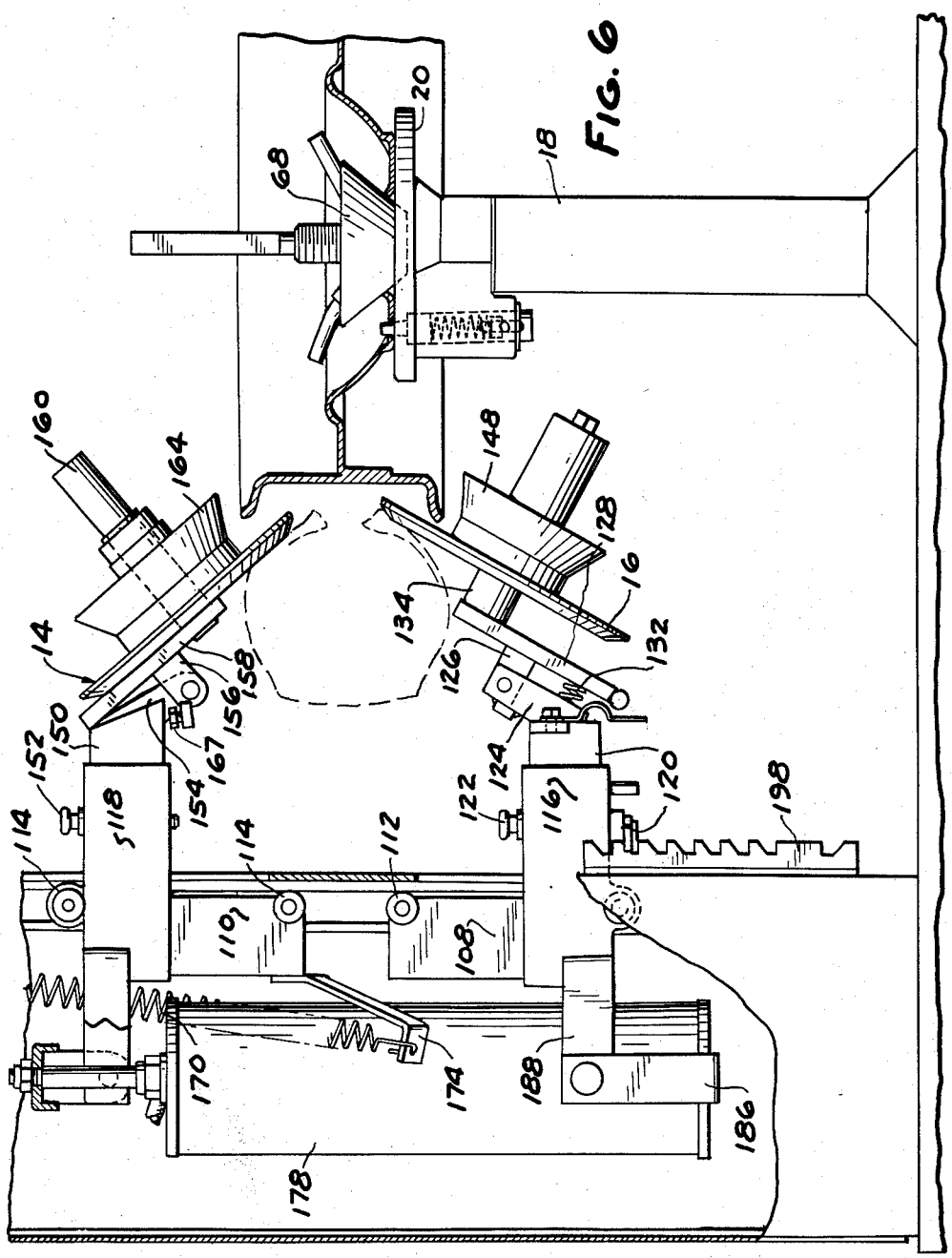

FIGURE 6, a view of the bead breakers and actuating mechanism as they operate on a tire.

Figure 7:
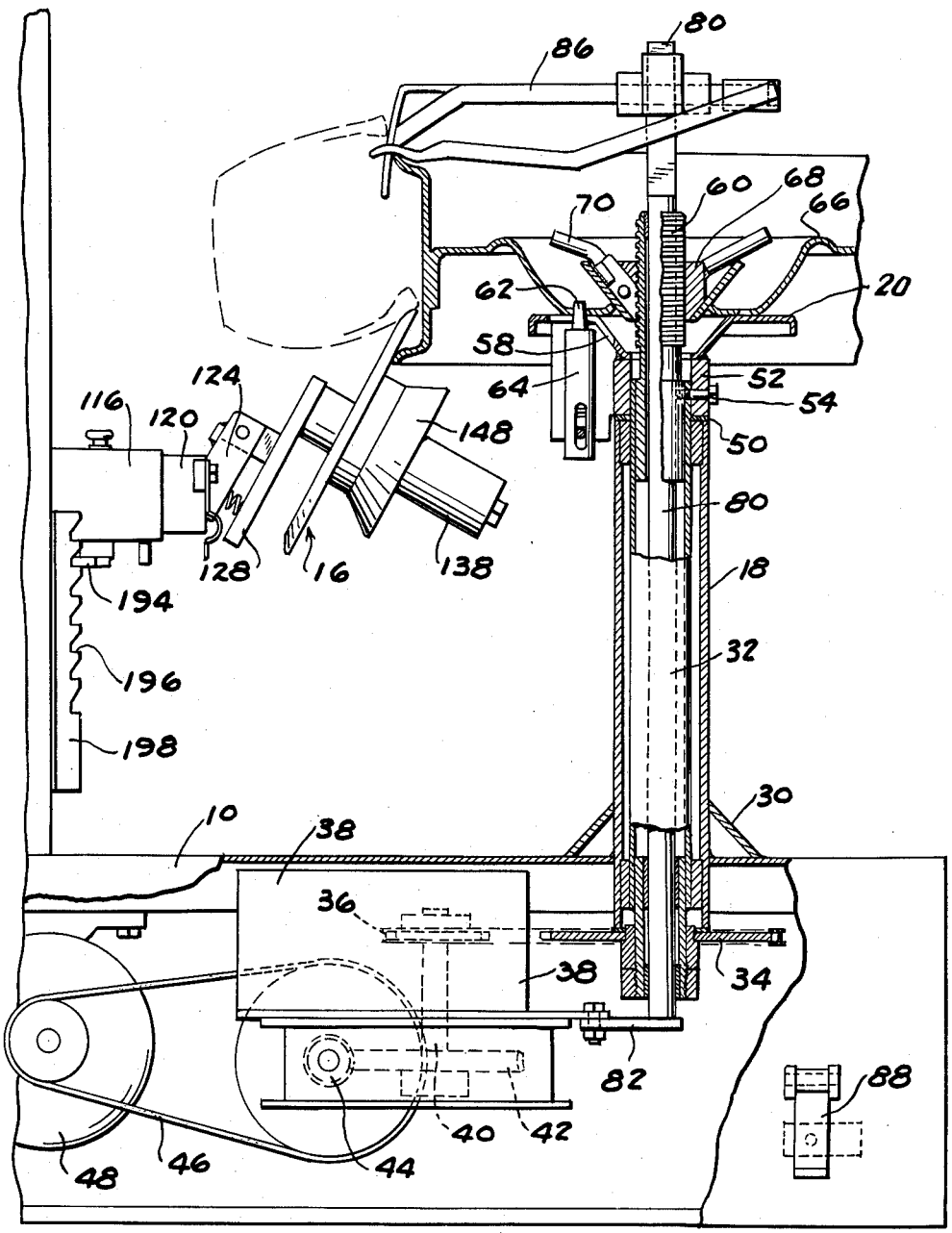

FIGURE 7, a view of the device showing the manner in which a tire removal or applicator tool is applied in combination with the lower bead breaker disc.

Referring to the drawings:

In FIGURE 1 the apparatus is shown having a base housing 10, an upright housing 12 for the vertical standard which carries the bead breaking discs 14 and 16 respectively, and the tire supporting column 18 having at its upper end a wheel supporting flange 20. A suitable air valve handle 22 extends through the housing 12 to a control valve (not shown) and a line 24 for an air pressure supply enters the housing 12 as shown.

Referring to FIGURE 7, the wheel supporting column 18 is shown in greater detail. This column is mounted on the top of the base 10, reinforced by a collar 30 welded to the column in the top of the base. The column extends downwardly into the base and contains bearings which support a tube 32 for rotation.

The tube has at its lower end a gear 34 actuated by a smaller gear 36 in housing 38, this gear being driven through a shaft 40 and a worm gear 42 from a speed reducing worm 44 driven by belt 46 from motor 48. The top of the column 18 is capped by a ring 50 and on this ring 50 in rotatable relation thereto is a cylindrical ring 52 locked to the tube 32 by a bolt 54.

On the cylindrical ring 52 is the wheel supporting flange 20 having a dished center 58 supported concentrically. The flange is apertured and a hollow threaded sleeve 60 extends up through the flange 20. This tube 60 is also locked to the ring 52 and the sleeve 32 for mutual rotation therewith. A spring-pressed stud 62 mounted on a finger 64 is movable axially relative to the finger 64 to engage a stud hole in the flange of a wheel 66 to lock the wheel for rotation with the flange 20. The sleeve and stud are pivotally mounted for radial movement in a slot in the wheel supporting flange 20 to adjust to different wheels.

A quick locking collar element 68 having a conical outer shape enters the center hole of the wheel disc around the threaded post 60 and a quick locking device comprising a slide block 70 moves in a slot in the collar to engage the thread groove of post 60, making it possible to lock a wheel disc on the flange 20 with a slight turning action.

In the center of this tire supporting assembly is a rod 80 supported at the bottom against rotation by an arm 82 fastened to the gear reducer housing 38. This rod extends upwardly through the post 60 and a few inches above it and has a flat 84 formed on the top end. This rod is intended to hold a radial tire arm such as element 86 in FIGURE 7 so that upon turning of the wheel by the rotating tube 32 the tire bead may be cammed on or cammed off of the wheel rim.

A suitable foot treadle 88 is provided at the right-hand end of the housing 10 connected into an electric circuit which causes starting or stopping of the motor 48 so that at the will of the operator the tube 32 can be rotated causing rotation of the wheel mounting flange 20 and the wheel 66.

Referring now to the bead breaking mechanism of the unit which cooperates with the tire holding and rotating mechanism, the vertical housing 12 has two vertical openings 100 and 102; and just inside the slots to either side are mounted opposed tracks 104. The top part of the tracks 104 angles upward and back in a small spur track 106 at the top. Mounted in these tracks at each end are slide brackets 108 and 110 at the bottom and top respectively, each having suitable rollers 112 and 114 to reduce the friction of the slide bracket in the track.

On each slide bracket is a bracket housing 116 and 118 at the bottom and top respectively, these housings being square in cross section and having a square opening. In the bottom housing 116 is mounted the bead breaker disc 16 on an adjustable bar 120 having a bolt 122 to lock it in place relative to the socket element 116. The bar 120 has an angled bracket arm 124 on which is pivotally mounted a lug 126 on a holding plate 128 for the bead breaking disc 16. A spring 132 urges the lower part of the plate 128 outwardly but permits the tire disc assembly 16 to pivot on the arm 124.

The disc assembly is slidable as shown in FIGURE 2. A cylinder mount or arbor 134 on the plate 128 extends outwardly and slidably mounted on this cylinder mount 134 is a second cylinder 136 on which the disc 16 is mounted. A sleeve bearing 137 is interposed between cylinder mount 134 and the slide cylinder 136. A tubular housing 138 closes the cylindrical element 136 and is itself closed by an end-plate 140 through which passes a bolt 142 serving as a spring guide and seat for a spring 144 which normally urges the disc 16 and its mounting cylinders back toward the plate 128. Concentric with the disc is a flanged cylinder 146 having a flange portion 148 which serves as a stop against a tire rim after the bead has been broken.

At the top of the machine the bracket housing 118 slidably receives an adjustable bar 150 held in an adjusted position by a pin or slide bolt 152. The bar 150 has a mounting bracket arm 154 for a mounting stud 156 on a plate 158 which mounts the disc 14. On the plate 158 is a cylindrical rod 160 on which the disc 14 rotates with a suitable bearing relationship, the disc 14 having a concentric flange 162 with an outwardly flange portion 164. The assembly is held on the rod 160 by a snap-ring 166. An adjustable stop bolt 167 limits the downward motion of the disc 14. The entire assembly carried on the slide 110 and the bracket housing 118 can tilt upwardly when the top roller 114 enters the angled spur track 106 as shown in FIGURE 3. This is an over-center locked position controlled by a spring 170 acting at one end on a stationary spring bracket 172 at the top of track 104 and at the other end on spring bracket 174 extending downwardly and to the side of the slide 110 to clear the force multiplying means to be described. This spring tends to return the upper arm 118 to the locked position shown in FIGURE 3 which moves it up out of the way of the operator when not in use. When the tire is in place, the extending rod 160 can be used as a handle to pull the bracket 118 down against the action of the spring 170 and out of locked position into place for actuation.

The power actuation of the slide brackets 108 and 110 is effected by a piston 176 acting in a cylinder 178 and having a rod 180 which is connected to a yoke 182 in turn pivotally connected to a rearwardly extending bracket 184 on the bracket housing 118. As shown in FIGURE 3, this arrangement permits the motion required. The cylinder 178 is held at the bottom by a saddle bracket 186 which in turn is pivotally connected by a suitable yoke 188 to the lower bracket housing 116. The cylinder and piston rod are not otherwise supported so that it will be seen that pressure introduced into the top of the cylinder 178 through a feed line 190 controlled by the air valve 122 will cause the two bracket housings 116 and 118 to approach each other, unless one of them is blocked by some means. On some occasions when the bottom bead breaks before the top bead, the bottom bracket housing 116 can be blocked against motion by a suitable latch 192 (see FIGURE 1). It is also possible to limit the lowering motion of the bracket housing 116 by a pivoted latch lever 194 which can be swung into contact with the teeth 196 of a ratchet strip 198. Also when the top bracket is positioned as shown in FIGURE 3, it is locked in place until moved down from its over-center position.

On the back of the housing 12 a convenient air hose fixture 200 can be provided for an air hose 202 to permit inflation of tires that are applied to wheels on the unit.

In the operation of the device, it will be seen that a tire and wheel assembly can be applied to the column 18 resting on the flange 20 and locked in place by a locking collar 68 as shown, for example, in FIGURES 6 and 7. The hand valve 122 can then be actuated to admit air to the top of the cylinder 178 at the same time the operator pulls the bar 160 down after the tire is in position; and the air pressure will bring the two brackets 116 and 118 toward each other, bringing the bead breaking discs 14 and 16 into contact with the tire just outside the rim.

As this contact is made (see FIGURE 6) the operator can step on the switch actuator 88 which causes the wheel and tire to rotate and also causes the discs to rotate on their bearing mounts. Thus as the tire rotates around the column 18, the bead is broken away from the rim all the way around. The flanges 148 and 164 will stop the vertical motion of the discs as they contact the rim of the wheel. It is now possible to remove the tire from the wheel by utilizing the tire irons which are fastened to the rod 80. With a suitable tire iron, a portion of the upper bead of the tire is pried upwardly over the rim of the wheel and a stationary radial tool 86 can then be inserted between the bead and the wheel. At the same time, the wheel can be rotated by the motor 48 and the tire upper bead will be removed. If desired at this time, the lower disc may be operated to create an upward thrust on the tire, the bracket arm 116 having been latched in place at a suitable level to accomplish this.

After the upper bead is removed, the lower bead can be raised above the upper edge of the rim by a suitable tire iron in the same process repeated so that the tire is completely free of the wheel. Upon reapplication of the tire, the same process is repeated by placing one portion of the tire over the wheel and putting the tire arm in place to force the remainder of the bead over the edge of the rim as the wheel is rotated. This is accomplished for the two beads, and then in the case of tubeless tires, a tire expandor ring is applied against the outer periphery of the tire to expand the beads of the tire to the point that air introduced into the wheel rim will expand the beads against the edges of the wheel rim to create a seal.

The device is so arranged that both beads may be broken at the same time as illustrated in FIGURE 6 or, if desired, the upper bead can be broken while the bracket arm 116 is locked down and then the lower bead can be broken either independently by moving the upper bracket arm into the position shown in FIGURE 3 where it is locked or the lower bead may be broken while the upper bead is being removed in an action shown in FIGURE 7. The device, therefore, is very versatile and can be operated to suit the particular desires of any operator.

What we claim is:

1. In a tire changing apparatus of the type having a base, a rotatable wheel and tire support on a vertical axis on said base, and a vertical column adjacent said support, that improvement which comprises a vertical track on said column extending above and below and tire support, a bottom slide operable vertically in said track below said tire support, an upper slide operable vertically in said track above said tire support, a vertically disposed force multiplying means connecting said slides to assist in the vertical support thereof and to operate said slides simultaneously or individually, means to lock each slide independent of the other wherein the other may be operated independently, supporting arms extending from each said slide in the direction of said tire support, a rotatable bead breaking disc on each supporting arm, said dics being adjustably supported in planes coverging toward said tire support wherein said discs may be operated against a tire on said support simultaneously or selectively.

2. A device as defined in claim 1 in which said slides and force multiplying means are biased upwardly by a resilient means acting on said upper slide.

3. A device as defined in claim 1 in which the upper slide means is pivotally connected to said force-multiplying means and includes means slidably engaging said track at vertically spaced points, a spur track connected to said vertical track to receive the upper of the two track engaging means of the upper slide wherein the upper slide is positioned acock the vertical slide, and resilient means interconnecting said column and said upper slide for exerting an upward force on said upper slide connected to the column above said spur track and to the lower end of the upper slide, the upper track engaging means of said upper slide crossing the line of force of said resilient means in moving from said vertical track to the acock position on said spur track, to thereby lock said upper slide in an over-center position until manually released.

4. An apparatus as defined in claim 1 in which the upper slide includes means slidably engaging said vertical track at vertically spaced points, said track at its upper end having a rearwardly inclined section to receive the uppermost engaging means of said upper slide whereby said upper slide can tilt rearwardly to a storage position at the uppermost portion of its travel, a bracket housing extending normal to said slide in the direction of said tire support to adjustably support said upper disc, a rearwardly extending first arm at the top of said upper slide, a downward and rearwardly extending second arm on said upper slide, resilient means connected to said column above said track and connected to said second arm to urge said upper slide into storage position, the force multiplying means being pivotally connected to said first arm to act vertically on said upper slide.

5. An apparatus as defined in claim 4 in which the force multiplying means comprises a fluid cylinder and piston motor, one element of which is pivotally connected to said first arm, and the other element of which is pivotally connected to the lower slide, said elements being otherwise unsupported, and means to direct pressure to said piston to cause said upper and lower slides to move toward each other in said track.

6. A device as defined in claim 1 in which each tire disc has a central concentric axial extension flared outwardly at the outer end to limit the motion of the disc toward the tire by contact with a tire rim.

7. A device as defined in claim 1 in which the lower tire disc is associated with the bottom slide by means comprising a mounting plate, an arbor on said plate, a mounting sleeve concentrically carrying said disc rotatably and slidably mounted on said arbor, and resilient means urging said sleeve and disc toward said plate.

8. A device as defined in claim 1 in which the means to limit the lower motion of said lower slide comprises a vertical ratchet plate adjacent said track, and a lock lever pivoted on said lower slide to cooperate with said ratchet plate.

9. In a tire changing apparatus of the type having a base, a support adapted to rotatably support a wheel and tire on said base, and a column adjacent said support, that improvement which comprises a track on said column extending transversely from both sides of the plane of rotation of the tire on said support, a first bracket operable in said track for movement therealong on one side of the plane of rotation of the tire on said support, a second bracket operable in said track for movement therealong on the other side of the plane of rotation of the tire on said support, force multiplying means interconnecting said brackets to assist in operably spacing said brackets on said tracks and to operate said brackets for movement simultaneously or individually, means to lock each bracket independent of the other wherein the other may be operated independently, a supporting arm extending from each of said brackets towards said tire support, a rotatable tire bead breaking disc on each supporting arm, said discs being adjustably supported in planes converging toward said plane of rotation of the tire on said support wherein said discs may be operated against the tire on said support simultaneously or selectively.

10. A device as defined in claim 9 wherein said base is disposed substantially horizontally and said tire support, said column and said track are disposed in substantially vertically extending relation to said base, said first and second brackets being respectively operable below and above the tire on said support, and including resilient means connecting said first bracket to said column for biasing said first bracket upwardly along said vertical track, said force multiplying means being suspended from said first bracket and said second bracket receiving vertical support from said force multiplying means to thereby provide a resilient suspension of said brackets on said track.

References Cited in the file of this patent

UNITED STATES PATENTS

| 1,445,784 | Mayer et al. | Feb. 20, 1923 |
| 2,439,135 | Johnson et al. | Apr. 6, 1948 |
| 2,534,950 | Butterfield et al. | Dec. 19, 1950 |
| 2,798,540 | Branick | July 9, 1957 |
| 2,837,147 | Henderson et al. | June 3, 1958 |

FOREIGN PATENTS

| 161,851 | Australia | Mar. 10, 1955 |